Aug. 15, 1967 R. W. POST 3,335,543

FILM MOUNTER WITH APERTURE-OPENING TONGUE

Filed March 29, 1965

INVENTOR.
RICHARD W. POST

BY Hill, Sherman, Meroni, Gross & Simpson
ATTORNEYS

United States Patent Office 3,335,543
Patented Aug. 15, 1967

3,335,543
FILM MOUNTER WITH APERTURE-OPENING TONGUE

Richard W. Post, Des Plaines, Ill., assignor to Microseal Corporation, Chicago, Ill., a corporation of Illinois Filed Mar. 29, 1965, Ser. No. 443,549
16 Claims. (Cl. 53—255)

ABSTRACT OF THE DISCLOSURE

A film mounting apparatus for inserting a film slide into a record card pocket which is formed in a record card. The pocket is formed by a rectangular opening in the card which is covered on both sides with a transparent enveloping member, however, on one side of the card the enveloping member is secured to the card only near three sides of the rectangular opening, the fourth side providing an access opening through which the film slide is inserted into the pocket. The film mounting apparatus is provided with a card bed for receiving the record card and a pocket-opening tongue extending over a portion of the card bed and cooperable therewith to quickly and easily open the access opening for proper insertion of the film slide.

Figures 1, 2, 3:
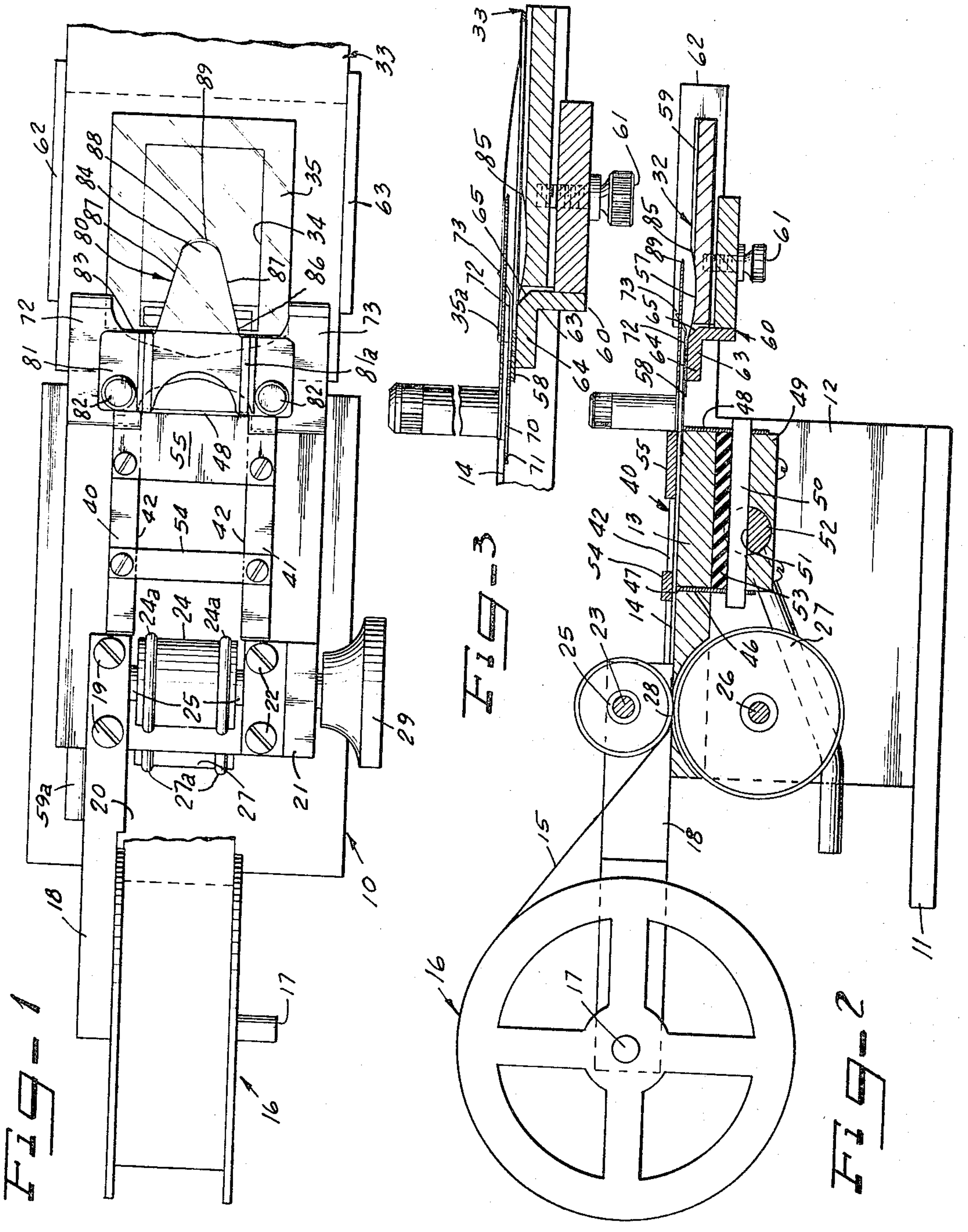

This invention relates to an apparatus for feeding cut pieces of microfilm into film pockets formed within microfilm record cards.

Film mounting assemblies have been devised in order to provide a means for mounting cut pieces of microfilm directly into the film pockets of microfilm record cards. A microfilm record card or suspension carrier card has an aperture formed therein which has transparent developing members or sheets disposed on opposite sides of the card and overlying the aperture. The sheets, if rectangular in configuration, have three edges thereof secured to the opposed surfaces of the card by means of suitable adhesive materials or the like which are placed on the card along the edges of the aperture but the fourth edge of at least one of the sheets is not sealed to the card although it does overlie the surface of the card. A cut microfilm strip can be maintained in the pocket formed intermediate the enveloping members.

If the film strip is translucent and the enveloping members are transparent, the film strip may be viewed while still mounted on the record cards since light may be transmitted through the transparent enveloping members. Thus, projectors can be arranged to accept such record cards so that the image on the film strip contained within a card can be projected onto a screen to enlarge the image without necessitating the removal of the film strip from its mounted position on the record card.

While the insertion of two or three cut film strip pieces into film pockets in a like number of record cards can be effected by hand, it is manifest that in those situations in which large numbers of film pieces must be card-mounted, the hand mounting procedure is not practicable. Furthermore, hand-mounting film pieces within record card film pockets is time consuming and may cause finger prints or stains to appear on the film which would blur the image formed thereon when that image is projected on a screen.

The instant invention finds particular utility in connection with an apparatus for cutting film pieces from an elongated film strip and inserting those film pieces into the film pockets formed in a multiplicity of cards. In particular, the instant invention consists in the provision of an aperture-opening tongue which forms a part of the film mounting assembly and which serves to hold the unsecured edge of an enveloping member in spaced relation from the adjacent surface of the record card when the card lies in a film strip-receiving position in the mounting assembly to facilitate movement of a cut film piece into the record card pocket. In addition, the aperture-opening tongue is designed so that it can readily be slid into the access opening between the enveloping member and the adjacent card surface and so that it will protect the enveloping member from being cut by the leading edge of the cut film piece as that film piece is moved into the aperture.

It is therefore a principal object of the present invention to provide an improved means for inserting a cut film piece into the pocket of a film record card.

Another important feature of the invention resides in the provision of an aperture opening tongue which is suitably configurated to slide easily into the access opening between an enveloping member and the adjacent card surface of a suspension carrier card so as to facilitate insertion of a film strip into the record card pocket.

Still another and more specific object of the invention resides in the provision of a tapered aperture-opening tongue which will protect the enveloping member from being cut as microfilm is slid into position in the card pocket of a suspension carrier card.

These and other objects, features, and advantages of the present invention will become apparent from time to time as the following specification proceeds, and with reference to the accompanying drawings, wherein:

FIGURE 1 is a plan view of a film mounting assembly constructed in accordance with the principles of the present invention and showing a suspension carrier card positioned on the card bed of the film mounting assembly with the aperture-opening tongue properly positioned in the access opening to the card pocket intermediate the enveloping member and the adjacent card surface;

FIGURE 2 is a side elevational view of the film mounting assembly shown in FIGURE 1 and showing some parts in vertical section; and FIGURE 3 is a fragmentary vertical sectional view of a portion of the assembly shown in FIGURE 2 which shows a suspension carrier card seated on the card bed of the film mounting assembly with the aperture opening tongue holding the enveloping member in spaced relation from the adjacent surface of the record card.

The film feed mechanism illustrated in the drawings comprises a support 10 including a base 11 and a pair of spaced vertical side walls 12. An upper plate 13 of the support 10 has an elongated recess comprising a film bed 14 formed therealong which is adapted to receive a microfilm strip such as the strip 15. The side walls of the film bed act as guides to guide the film strip 15 through the film bed to thereby form a film channel for directing film strips through the assembly and these side walls are spaced apart a distance approximately equal to the width of the film strip 15.

The film strip 15 is wound on a spool 16 which, in turn, is rotatably mounted on a pin 17 extending outwardly from a rearwardly extending leg 18 which is connected to the support 10 by screws 19. The inner side wall 20 of the leg 18 is disclosed in coplanar relation with one of the side walls of the film channel to serve as an additional guideway for guiding the film strip into and through the film bed 14. A guide block 21 is secured to the upper plate 13 by screws 22 and has its inner surface spaced from the inner surface 20 of the leg 18 a distance approximately equal to the width of the film strip 15 and in coplanar relation with the opposite side wall of the film channel. A shaft 23 has one end journaled in the guide block 21 and its opposite end journaled in the leg 18 and has a roller 24 formed of rubber or a rubber-like material mounted thereon which, in turn, has protruding annular beads 24*a* extending circumferentially around each end thereof. The roller is maintained in a fixed position on the shaft 23 between the leg 18 and the blocks 21 by means of spacers 25.

A shaft 26 is likewise journaled within the vertical side walls 12 at a point spaced directly below the shaft 23 and beneath the plate 13 and has a roller 27 with protruding annular beads 27*a* formed about the roller mounted thereon. The plate 13 is apertured as at 28 and the protruding annular beads 27*a* on the roller 27 are of sufficient diameter to extend slightly up into this aperture. The annular beads 24*a* of the roller 24 contact the annular beads 27*a* at the aperture 28 and this point of tangency is disposed in the same plane as the plane of the film bed 14.

In the illustrated embodiment of the invention, the spool 16 is mounted on the spindle 17 so that the film strip 15 extends from the top of the spool to the point of tangency of the roller beads and onto the film bed 14. A knob 29 is keyed to the shaft 26 so that clockwise rotation of that knob (as viewed in FIGURE 1) will act to pull the film strip 15 from the spool 16 and through the rollers and thence onto the film bed 14. The spool 16 will then rotate on the spindle 17 as the film strip is pulled through the rollers.

The right hand end of the plate 13 is recessed somewhat from the plane of the film bed 14 and defines a generally horizontal card bed 32 which bed lies in a plane parallel to but spaced slightly below the plane of the film bed 14. In fact, the card bed 32 lies in a plane which is spaced below the plane of the film bed 14 a distance slightly greater than the thickness of a film record card 33.

The film record card 33 has a rectangular aperture 34 formed therein and transparent enveloping members or sheets 35 (also rectangular in configuration) mounted on the top and bottom surfaces, of the card so that they overlie the aperture 34. Enveloping members 35 are mounted over the apertures 34 so that their edges overlie portions of the card defining the aperture but only three edges of at least one of the enveloping members (in this case, the topmost one) are secured to the card. An unsecured portion 35*a* of the enveloping member overlies the card along the edge of the aperture adjacent the nearest end of the card to provide an access opening to the film pocket formed intermediate the enveloping members. It is at this access opening between the unsecured edge of the enveloping member and the adjacent underlying surface of the card that a film strip is inserted into the record card pocket. The card pocket of course is that spaced formed intermediate the enveloping members which pocket is defined by the four edges of the aperture.

Top plates 40 and 41 are mounted on the upper plate 13 and have their innermost edges 42 slightly overhanging the film bed 14. The undersurfaces of the overhanging edges of the top plates 40 and 41 are spaced vertically above the surface of the film bed 14 a distance equal to or only slightly greater than the thickness of the microfilm to be passed therethrough so that they will be effective to flatten on the film bed and prevent the roll of microfilm from overriding a cut film piece positioned within the film bed. An aperture 46 slidably receives a slitter blade 47 while a second slitter blade 48 is slidable along an end face of the top plate 13. The blades are fixed to a slitter block 49 and a pair of connecting rods 50 extend longitudinally of the plate 13 through the blades 46, 48 and on top of the block 49. The rods 50 are received within square-cut apertures 51 formed transversely through a cylindrical member 52 so that rotation of the cylindrical member 52 from the position illustrated in FIGURE 2 will act to urge the rods 50 upwardly and thus move the slitter blades 46, 48 through a film lying on the film bed to cut that film. A resilient cushion 53 is positioned on the undersurface of the plate 13 between the blades 46, 48 and between the plate and the rods 50 and this cushion serves as a spring to bias the blades 46, 48 to the illustrated position. A lever arm 52*a* extends from member 52 so that depression of the arm will effect rotation of the member 52.

Suffice it to say that cutting blocks 54, 55 are provided across the film bed and that these blocks cooperate with the blades 46, 48 to provide a means for positively cutting the film lying within the bed to form a cut film piece suitably sized for placement within the card pocket of a suspension carrier card. The blades have cutting edges extending entirely across the film bed and are spaced apart a desired distance corresponding to the desired length of the cut film pieces. In present standard practice the blades would be set apart a distance of approximately 1.9 inches.

The card bed 32 has a dished-out section 57 formed therein at a point adjacent but spaced slightly from the shoulder 58 which connects the card bed with the film bed and the dished-out portion is parallel to that shoulder. Another hollow 59 is formed in the card bed and centrally thereof and this hollow is perpendicular to the dished-out portion 57.

A guide block 60 is connected to the undersurface of the card bed 32 by means of a pair of screws 61 and this guide block has spaced apart upstanding vertical walls 62, 63 which are spaced apart a distance approximately equal to the width of the film record card 33 and extend upwardly above the plane of the card bed 32 to provide a means for positively positioning the card 33 in the desired location on the mounter. A right angular section 63 of the guide block 60 has a leg 64 extending upwardly within an aperture in the card bed 32 to provide a seating surface for the left hand-most end of the record card 33 and has a chamfer 65 formed therein which serves to raise up the leading edge of a record card from the dished portion 57 of the card bed to the higher plane of the leg 64 as the card is inserted into the mounting assembly.

A bracket 70 comprises a substantially flat piece of resilient metal which has a base end seated within a recess 71, which recess has a depth equal to the thickness of the sheet metal member 70 so that the upper surface of the metal member 70 is contiguous with the surface of the film track 14. The bracket 70 has a pair of hold-down tabs formed integrally therewith and extending from opposite sides thereof out over the card bed with upturned ends 73 formed thereon just immediately above the left hand-most edge of the hollow 57. The hold-down tabs serve to grip the leading edge of a film record card as the card is inserted into the assembly so as to hold the card in place with its upper surface lying slightly below or on the plane of the film track 14.

Lying on top of the bracket 70 is the aperture-opening tongue 80 which proves so useful in opening up the card pocket to facilitate insertion of a film piece thereinto. The tongue 80 has a base 81 which lies on top of the bracket 70 and these two members are held in position relative to one another on the support plate 13 by a pair of large headed bolts 82. The base 81 terminates at its right hand-most end in a straight edge 83 which is parallel to and spaced above but disposed somewhat to the left or rear of the shoulder 58 and the tongue 80 is formed integrally therewith and extends therefrom over the card bed 32, terminating at a point just above the edge 85 of the hollow 57.

The base of the tongue 80, as at 86, is somewhat narrower than the width of the access opening to the record card pocket and side walls 87 of the tongue taper from that base to a rounded end portion 88. The upper surface of the tongue at the rounded end 88 is chamfered or beveled as at 89 to insure that the tongue will readily slip between the enveloping member on the card 33 and the upper surface of the card when the card is inserted into position on the card bed 32.

In operation, it will be observed that a record card can be slid into position on the card bed with the surface of the card initially held at an angle relative to the bed 32 and once the tongue 84 has slipped between the enveloping member and the upper surface of the card, the card can then be forced into position beneath the hold-down tabs 72 and up against the shoulder 58.

After the record has been thus positioned, depression of the lever arm 52*a* will rotate the double shaft 52 and urge the slitter blades upwardly through the slits in the film track to cut the film strip lying therein to a desired size. Rotation of the knob 29 will then force the cut film piece lying in the film track intermediate the slitter blades along the film track, onto the upper surface of the aperture card, and along the path provided intermediate the undersurface of the tongue 80 and the aperture card and the hold-down plate and thence into the film pocket. The tongue 80 will prevent tearing of the enveloping member upon insertion and also provides an arrangement wherein film can effectively be inserted into the record card pocket with its natural curl up or down.

The illustrated embodiment of this invention has been used for illustrative purposes only and various modifications and variations in the invention may be effected without departing from the spirit and scope of the novel concepts thereof.

I claim as my invention:

1. A film feed mechanism for feeding film into a record card pocket formed by at least one enveloping member mounted on a card surface which comprises:
- a support having a card bed and having a film track leading to said card bed, means on said card bed for receiving the leading edge of the card, and
- a pocket-opening tongue carried by said support above said track and extending over said card bed in cooperation with said means to slide between the upper surface of a card positioned on said card bed and an enveloping member mounted thereon to open the film pocket within the card and guide a film slid along the said film track into the card pocket.

2. A film feed mechanism for feeding film into a record card pocket formed by at least one enveloping member mounted on a card surface and providing an access opening to the pocket at one end thereof, comprising:
- a support having a card bed and having a film track leading to said card bed, means on said card bed for receiving the leading edge of the card,
- a film strip guide overlying said film track a distance only very slightly greater than the thickness of film to be moved along said track; and a pocket-opening tongue carried by said support above said track and comprising an extension of said guide and extending over said card bed in cooperation with said means to be slid into said access opening to open the film pocket within the card and guide a film slid along the said film track into the card pocket.

3. A film feed mechanism for feeding film into a record card pocket formed by at least one enveloping member mounted on a card surface and providing an access opening to the pocket at one end thereof, comprising:
- a support having a card bed and having a film track leading to said card bed; means on said card bed for receiving the leading edge of the card and
- a tapered pocket-opening tongue having a broad base and side walls converging therefrom to a rounded free end,
- said tongue being carried by said support above said track and extending over said card bed in cooperation with said means to have said rounded free end slid into the access opening between the upper surface of a card positioned on the said card bed and an enveloping member mounted thereon to open the film pocket within the card and guide a film slid along the said film track into the card pocket.

4. A film feed mechanism for feeding film into a record card pocket formed by at least one enveloping member mounted on a card surface and providing an access opening to the pocket at one end thereof, comprising:
- a support having a card bed and having a film track leading to said card bed; and a tapered pocket-opening tongue carried by said support above said track and extending over said card bed and having a broad base section overlying said card base and side walls converging therefrom to a rounded free end;
- said tongue being so positioned and dimensioned that said broad base section extends across substantially the entire length of said access opening in a card positioned on said card bed, being adapted to slide between the upper surface of a card positioned on said card bed and an enveloping member mounted thereon to open the film pocket within the card and guide a film slid along the film track into the card bed without damage to the enveloping member.

5. A film feed mechanism for feeding film into a record card pocket formed by at least one enveloping member mounted on a card surface and providing an access opening to the pocket at one end thereof, comprising:
- a support having a card bed and having a film track leading to said card bed; a trough formed in said card bed for receiving the leading edge of the card; and
- a tapered pocket-opening tongue having a broad base and side walls converging therefrom to a rounded free end,
- said tongue being carried by said support above said track and extending over said card bed in cooperation with said trough to have said rounded free end slid into the access opening between the upper surface of a card positioned on the said card bed and an enveloping member mounted thereon to open the film pocket within the card and guide a film slid along the said film track into the card pocket, and
- wherein the upper surface of said rounded free end of said tongue is beveled to a thin edge to insure entry of said tongue into said access opening.

6. A film feed mechanism for feeding film into a record card pocket formed by at least one enveloping member mounted on a card surface which comprises:
- a support having a card bed and having a film track leading to said card bed, a trough formed in said card bed for receiving the leading edge of the card, and
- a pocket-opening tongue carried by said support above said track and extending over said card bed in cooperation with said trough to slide between the upper surface of a card positioned on said card bed and an enveloping member mounted thereon to open the film pocket within the card and guide a film slid along the said film track into the card pocket, and
- wherein the upper surface of said rounded free end of said tongue is beveled to a thin edge to insure entry of said tongue into said access opening.

7. A film feed mechanism for feeding film into a record card pocket formed by at least one enveloping member mounted on a card surface and providing an access opening to the pocket at one end thereof, comprising:
- a support having a card bed and having a film track leading to said card bed; and a tapered pocket-opening tongue carried by said support above said track and extending over said card bed and having a broad base section overlying said card bed and side walls converging therefrom to a rounded free end;
- said tongue being so positioned and dimensioned that said broad base section extends across substantially the entire length of said access opening in a card positioned on said card bed, being adapted to slide between the upper surface of a card positioned on said card bed and an enveloping member mounted thereon to open the film pocket within the card and guide a film slid along the film track into the card bed without damage to the enveloping member, and wherein the upper surface of said rounded free end of said tongue is beveled to a thin edge to insure entry of said tongue into said access opening.

8. A film feed mechanism for feeding film into a record card pocket formed by at least one enveloping member mounted on a card surface and providing an access opening to the pocket at one end thereof, comprising:

a support having a card bed and having a film track leading to said card bed; means providing an upper surface for the film within said film bed, being spaced above the plane of said film bed a distance slightly greater than the thickness of film to be passed along said bed; and a tapered pocket-opening tongue carried by said support above said track and extending over said card bed and having a broad base section overlying said card base and side walls converging therefrom to a rounded free end;

said tongue being so positioned and dimensioned that said broad base section extends across substantially the entire length of said access opening in a card positioned on said card bed, being adapted to slide between the upper surface of a card positioned on said card bed and an enveloping member mounted thereon to open the film pocket within the card and guide a film slid along the film track into the card bed without damage to the enveloping member, and wherein said tongue has an undersurface substantially contiguous with said guide surface.

9. A film feed mechanism for feeding film into a record pocket formed by at least one enveloping member mounted on a card surface and providing a pocket access opening at one end of the pocket, comprising:

a support having a film bed and having a card bed with an end adjacent said film bed and recessed slightly from said film bed;

a shoulder leading from one to the other of said beds;

whereby a record card can be placed upon said card bed with an edge which is substantially parallel to said access opening disposed in engagement with said shoulder to position the upper surface of the record card flush with said film bed; and a pocket-opening tongue carried by said support and extending over said film bed and outwardly therefrom over said card bed and having an undersurface disposed in slightly upwardly spaced relation from the upper surface of a card lying on said card bed;

whereby said tongue can be slid into the access opening to a record card pocket as the card is moved into position on the card bed to hold the said enveloping member in spaced relation from the adjacent card surface and thereby insure free travel of a film strip from said bed, onto the card, and into the record card pocket without damage to the enveloping member.

10. A film feed mechanism for feeding film into a record card pocket formed by at least one enveloping member mounted on a card surface and providing a pocket access opening at one end of the pocket, comprising:

a support having a film bed and having a card bed with an end adjacent said film bed and recessed slightly from said film bed;

a shoulder leading from one to the other of said beds;

whereby a record card can be placed upon said card bed with an edge which is substantially parallel to said access opening disposed in engagement with said shoulder to position the upper surface of the record card flush with said film bed;

at least one hold-down tab mounted on said support adjacent said shoulder and extending over said card bed and having an upturned outer end;

said hold-down tab being resilient and serving to hold the end of a record card adjacent said shoulder flat on said card bed and below the adjacent end of the said film bed;

a pocket-opening tongue carried by said support and extending outwardly from said guide over said card bed and having an under surface disposed in slightly upwardly spaced relation from the upper surface of a card lying on said card bed;

whereby said tongue can be slid into the access opening to a record card pocket as the card is moved into position on the card bed to hold the said enveloping member in spaced relation from the adjacent card surface and thereby insure free travel of a film strip from said film bed, onto the card, and into the record card pocket without damage to the enveloping member.

11. A film feed mechanism constructed in accordance with claim 9 wherein said tongue has a relatively broad base end adjacent said shoulder, tapering to a rounded outer free end over said card bed and has a beveled upper surface at said outer free end.

12. A film feed mechanism constructed in accordance with claim 10 wherein said tongue has a relatively broad base end adjacent said shoulder tapering to a rounded outer free end over said card bed and has a beveled upper surface at said outer free end.

13. A film feed mechanism for feeding film into a record card pocket formed by at least one enveloping member mounted on a card surface and providing a pocket access opening at one end of the pocket, comprising:

a support having a film bed and having a card bed with an end adjacent said film bed and recessed slightly from said film bed;

a shoulder leading from one to the other of said beds;

whereby a record card can be placed upon said card bed with an edge which is substantially parallel to said access opening disposed in engagement with said shoulder to position the upper surface of the record card flush with said film bed;

a guide mounted on said support and overlying said film bed and defining a track for guiding film moved along said film bed to the pocket of a record card positioned on said card bed;

at least one hold-down tab mounted on said support adjacent said shoulder and extending over said card bed and having an upturned outer end;

said hold-down tab being resilient and serving to hold the end of a record card adjacent said shoulder flat on said card bed and below the adjacent end of the said film bed;

a pocket-opening tongue carried by said support and extending outwardly from said guide over said card bed and having an undersurface substantially contiguous with said guide and disposed in slightly upwardly spaced relation from the upper surface of a card lying on said card bed;

whereby said tongue can be slid into the access opening to a record card pocket as the card is moved into position on the card bed to hold the said enveloping member in spaced relation from the adjacent card surface and thereby insure free travel of a film strip from said film bed, onto the card, and into the record card pocket without damage to the enveloping member.

14. A film feed mechanism constructed in accordance with claim 10 wherein said card bed is dished somewhat at a point immediately below the free end of said tongue.

15. A film feed mechanism constructed in accordance with claim 10 wherein said card bed is dished along a line parallel to said shoulder and immediately underlying the free end of said tongue is also dished along a line perpendicular to said shoulder along a line intersecting with the center axis of said tongue.

16. A film feed mechanism constructed in accordance with claim 13 wherein said card bed is dished along a line parallel to said shoulder and immediately underlying the free end of said tongue is also dished along a line perpendicular to said shoulder along a line intersecting with the center axis of said tongue.

References Cited

UNITED STATES PATENTS

| | | | |
|---|---|---|---|
| 2,131,843 | 10/1938 | McMakin | 53—50 |
| 2,502,186 | 3/1950 | Tuohey | 53—50 |
| 2,554,624 | 5/1951 | Lorentzen | 53—255 |
| 2,892,295 | 6/1959 | McArthur | 53—123 |
| 3,141,275 | 7/1964 | Anderson | 53—123 |

RICHARD H. EANES, Jr., *Primary Examiner.*